United States Patent [19]
Walters et al.

[11] Patent Number: 5,440,334
[45] Date of Patent: Aug. 8, 1995

[54] BROADCAST VIDEO BURST TRANSMISSION CYCLIC DISTRIBUTION APPARATUS AND METHOD

[75] Inventors: Eric H. Walters, Phoenix, Ariz.; Richard A. Lang, Mendocino, Calif.; Earl I. Mincer, Scottsdale, Ariz.

[73] Assignee: Explore Technology, Inc., Scottsdale, Ariz.

[21] Appl. No.: 11,972

[22] Filed: Feb. 1, 1993

[51] Int. Cl.⁶ .................................................. H04N 7/13
[52] U.S. Cl. ......................................... 348/6; 348/7; 348/384
[58] Field of Search ................... 348/6, 7, 384; H04N 7/13

[56] References Cited

U.S. PATENT DOCUMENTS

| | | | | |
|---|---|---|---|---|
| 4,963,995 | 10/1990 | Lang | | 348/384 |
| 4,975,771 | 12/1990 | Kassatil | | 348/6 |
| 5,057,932 | 10/1991 | Lang | | 348/384 |
| 5,130,792 | 7/1992 | Tindell | | 348/7 |
| 5,168,353 | 12/1992 | Walker | | 348/6 |
| 5,247,348 | 9/1993 | Israelson | | 348/6 |

Primary Examiner—Howard W. Britton
Attorney, Agent, or Firm—William E. Hein

[57] ABSTRACT

An apparatus and method for broadcast burst transmission of compressed audio/video programs from a stored library to a multiplicity of subscibers. The stored programs are burst transmitted repeatedly in a predetermined sequence of entire programs or segments thereof to a receiver at each subscriber's location. Each receiver is operative for accessing the predetermined broadcast schedule, inputting a subscriber's order for one or more programs, monitoring the broadcast burst transmissions for the one or more ordered programs, receiving the one or more ordered programs in a burst time period corresponding to the time period of the burst transmission, and storing the one or more ordered programs. The subscriber then enjoys full VCR-like control over playback at his convenience of the ordered, stored programs, that are then decompressed by the receiver for viewing in real time.

61 Claims, 4 Drawing Sheets

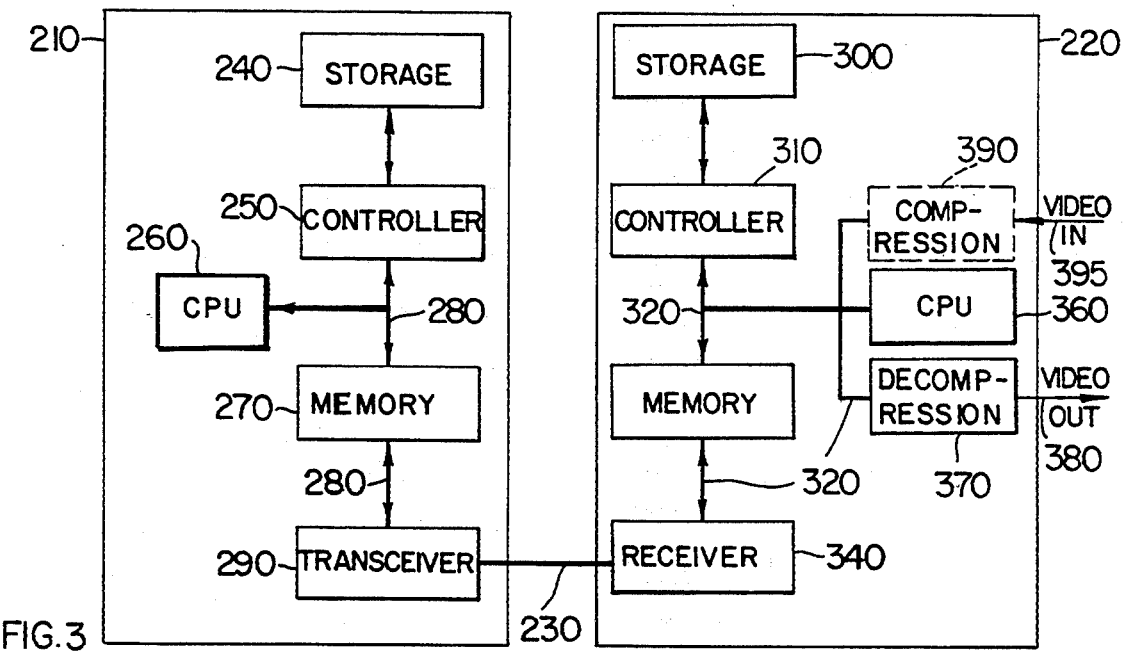
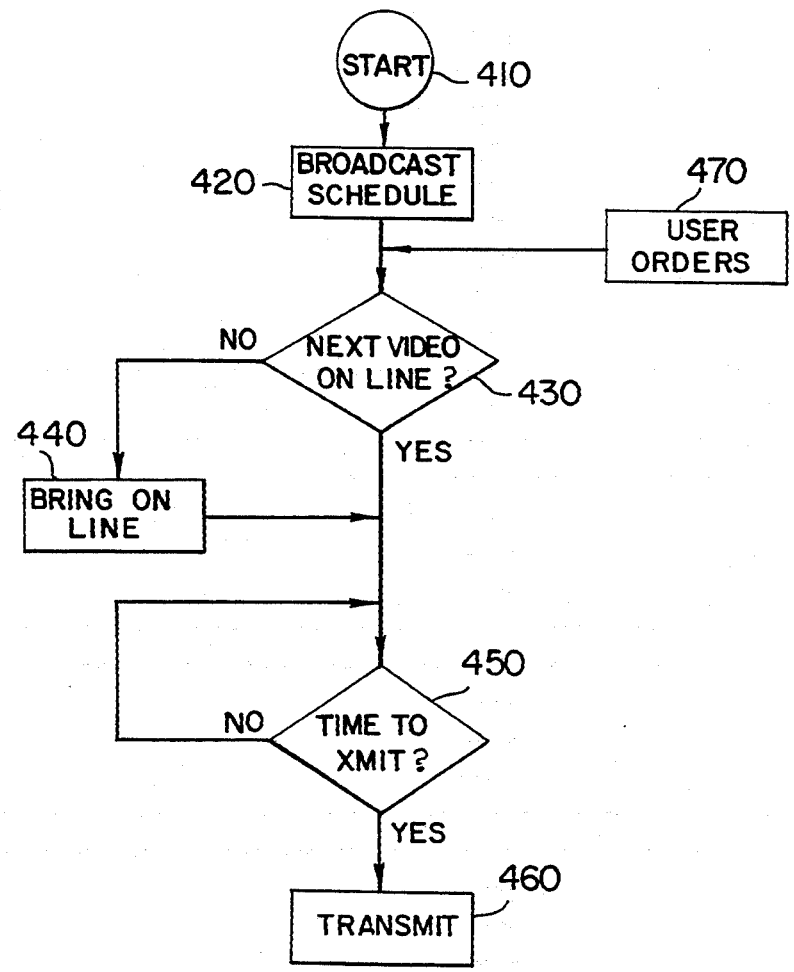
FIG. 4

BROADCAST VIDEO BURST TRANSMISSION CYCLIC DISTRIBUTION APPARATUS AND METHOD

CROSS-REFERENCE TO RELATED PATENTS

This application is related to U.S. Pat. Nos. 4,963,995 and 5,057,932, the subject matter of each of which is incorporated herein by reference.

BACKGROUND AND SUMMARY OF THE INVENTION

U.S. Pat. Nos. 4,963,995 and 5,057,932 to Lang teach the transmission of audio/video program information in a burst period of time that is substantially less than the time required for real time viewing of that audio/video program information. These prior art references teach the general aspects of compression, storage, burst transmission, reception, decompression, and display of audio/video program information. However, they do not address the specific aspects of a burst transmission system for cyclic distribution of audio/video program information. Cyclic distribution, as used herein, is directed to a method of transmitting audio/video program information that is commonly referred to as pay-per-view (PPV).

In a conventional PPV system, the subscriber selects an audio/video program, such as a movie, from a predetermined broadcast schedule. This ordering process can take place in many ways, such as calling a specified telephone number from a touch-tone telephone, pressing the appropriate keys on the cable converter box that is supplied by the service provider, speaking directly with an operator over a telephone, etc. In any case, the subscriber always selects a program from a predetermined schedule of programs that the service provider will be broadcasting in real time. When an order is placed, the cable converter box will automatically unscramble the program on the selected television channel so that the subscriber may view the program as it is being broadcast.

Video-on-demand (VOD) systems differ from PPV systems in that the subscriber may order any audio/video program from a list of available titles in an audio/video library. The selected audio/video program may be transmitted or otherwise distributed in whole or in part to the subscriber in a number of ways, including the less than real time burst transmission described by Lang. Regardless of the chosen transmission medium, the subscriber selects any available audio/video program for viewing or delivery, as opposed to tuning in to a broadcast that is on a predetermined schedule over which the subscriber has no control.

The present invention is directed at bridging the gap between PPV and VOD systems of the prior art. As in the VOD systems described in the prior art patents cited above, burst transmissions are utilized as the preferred distribution means. However, instead of providing an audio/video library that permits the subscriber to select any program for delivery, the present invention combines the predetermined, cyclic schedules of conventional PPV systems with the burst transmission technique taught by Lang. This combination results in simplified and lower cost video library equipment. It also results in a greatly enhanced PPV system from the subscriber's viewpoint. In a conventional PPV system, the audio/video programs are broadcast over coaxial cable, microwave, fiber optics or any of a variety of transmission systems in real time. That is, the programs are broadcast or literally played back in real time to the subscribers of such systems. Thus, it is not possible for the viewer to exercise VCR-type control during the playback, such as stop, pause, rewind or fast-forward. In providing an audio/video program broadcast schedule characteristic of conventional PPV systems, but using the burst transmission technique taught by Lang, the present invention provides enhanced user functionality over conventional PPV systems at a much lower cost than is associated with library-based VOD systems.

The apparatus of the present invention includes a central library storing a mulitplicity of time compressed digital audio/video programs that may be selectively transmitted in a burst time period to corresponding storage at one or more remote subscriber locations, where the transmitted program may be decompressed and viewed in accordance with the teachings of Lang. The central library provides cyclic, predetermined broadcast transmission of the time-compressed digital audio/video programs stored therein. A receiver at each of the remote subscriber locations continuously monitors a communications channel over which the sequential stream of time-compressed audio/video programs is broadcast from the central library, but is operative for storing only the program or programs that have been ordered by a subscriber.

BRIEF DESCRIPTION OF THE DRAWINGS

FIG. 3 is a block diagram of circuitry employed in the broadcast video burst transmission system illustrated in FIG. 1.

FIG. 4 is a flowchart of operation of the central library portion of the broadcast video burst transmission apparatus and method of FIG. 1 from the time a subscriber places an order for an audio/video program to the beginning of transmission of that audio/video program.

DETAILED DESCRIPTION OF THE PREFERRED EMBODIMENTS

Figure 1:
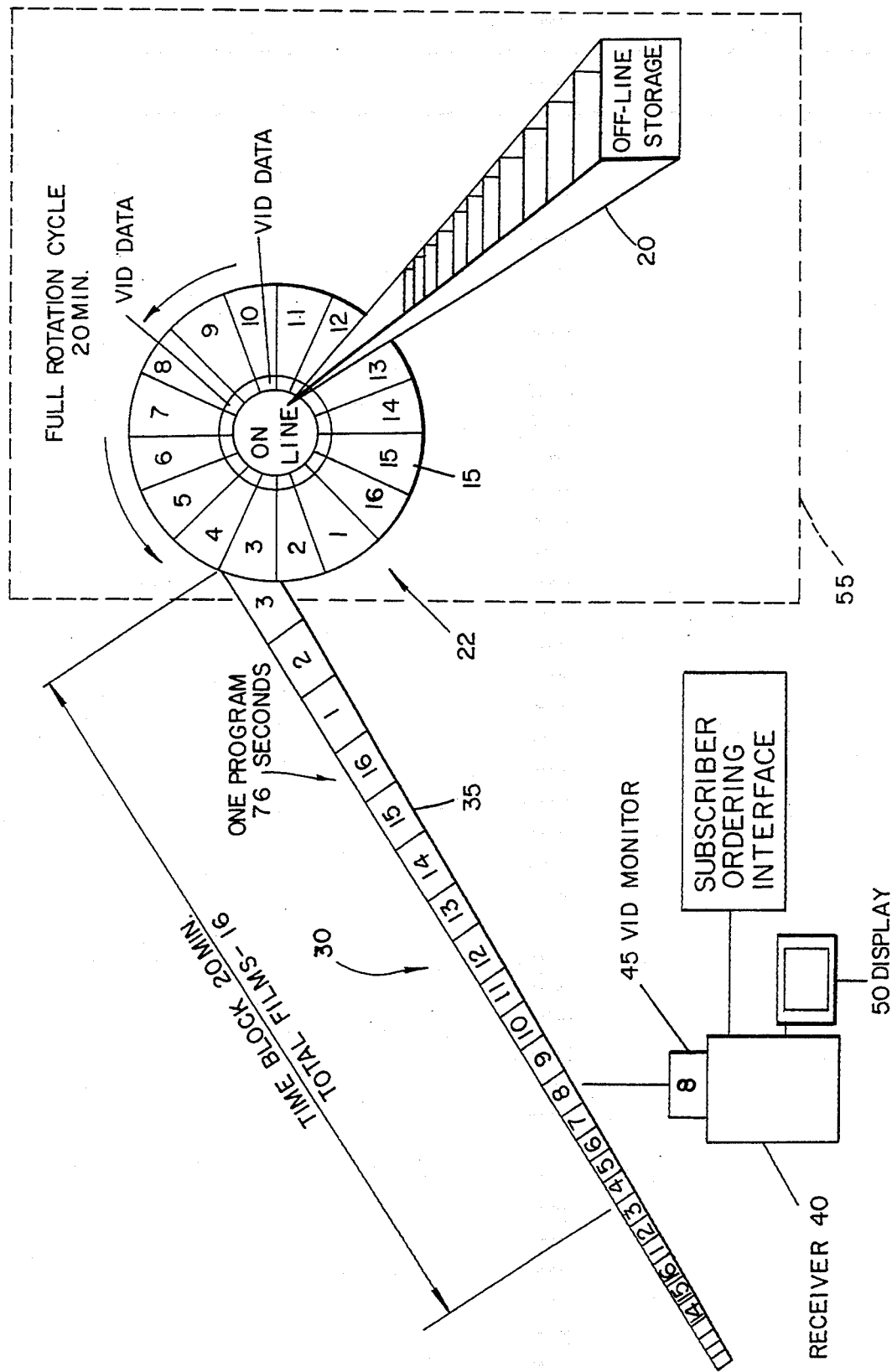
FIG. 1 is a pictorial diagram illustrating the broadcast video burst transmission system of the present invention.

Referring now to FIG. 1, there is shown a pictorial diagram conceptually illustrating the broadcast video burst transmission system of the present invention. A ring or wheel 22, rotating in a counter-clockwise direction, provides on-line storage of a plurality of audio/video programs, such as movies. It should be noted that the present invention does not include a physical wheel 22. Rather, wheel 22 is illustrated simply as an aid to understanding the concept of the present invention. The broadcast video burst transmission system also includes an off-line storage 20, a tranmsission line 30 that comprises a multiplicity of transmission segments 35, a receiver 40, and a monitor 45. Wheel 22, off-line storage 20, and external control software and hardware (not illustrated) comprise a library 55. In the system illustrated in FIG. 1, sixteen predetermined programs are stored on-line on wheel 22 of library 55 in a time-compressed format. On-line storage of programs on wheel 22 requires the reading of information therefrom at a sufficiently nigh rate to maintain a desired rate of transmission along transmission line 30. In one embodiment, for example, transmission line 30 operates at 114 Mbits/second, thus requiring high-speed storage media to access the stored programs. To reduce the expense associated with high-speed storage media, less poplular programs are stored on slower, less costly, off-line storage 20. These programs may be transferred to on-line storage on wheel 22 when appropriate.

Conceptually, wheel 22 comprises sixteen wheel segments 25, each one of which stores a program in a time-compressed format. The transmission of such a program in a burst time period that is much less than real time may be accomplished in accordance with the prior art teachings of the Lang patents, supra. The rotation of wheel 22 represents the predictable cycling through the sixteen most requested programs stored thereon. As wheel 22 rotates in the counter-clockwise direction illustrated, the programs stored thereon are sequentially transferred to transmission line 30 for burst transmission to all subscriber locations. In the system of FIG. 1, a sequential stream of the sixteen predetermined programs retrieved from on-line storage on wheel 22 is illustrated. At the instant in time depicted in FIG. 1, it may be seen that program number 3 has just been transferred onto transmission line 30, that program number 2 was immediately previously transferred, and that program number 4 will be immediately next transferred.

Each of the sixteen programs stored on wheel 22 is associated with a burst transmission time period that is much less that real time, as taught in the prior art by Lang. Transmission segment 35 of transmission line 30 is exemplary of such a burst transmission time period in that it represents the block of time required to transmit the entire program number 15. Given the transmission parameters detailed below, transmission segment 35 represents 76 seconds required to transmit the entire program number 15.

As stated previously, wheel 22 is illustrated as providing on-line storage of sixteen programs. For example, assume that the compressed digital video bitstream requires 1.2 Mbits/second for real-time playback, and that the transmission line 30 is a 36-MHz satellite channel modulated at approximately 4 bits/Hz plus overhead, resulting in a 114 Mbit/second digital transmission rate. Dividing the 114 Mbit/second transmission rate by the 1.2 Mbit/second compressed video bit rate results in a time compression factor of 95:1. In other words, a typical two-hour program will require a transmission time of 120 minutes divided by 95, or 76 seconds. Thus, in one hour, approximately 60 minutes divided by 1.26 minutes/program, or 47.5 programs, may be transmitted. Transmission of the sixteen programs stored on wheel 22 at 1.26 minutes each requires a total of 20 minutes. Therefore, wheel 22 requires 20 minutes to complete one revolution, with transmission of any single two-hour program stored thereon requiring 1.26 minutes. From another prespective, a subscriber will have to wait no longer than 1.26 minutes to begin viewing the next transmitted one of the predetermined sixteen programs stored on wheel 22 and will have to wait no longer than 20 minutes to begin viewing any selected program from among the sixteen offered, resulting in an average waiting time of 10 minutes. Of course, a different digital compressed video rate and transmission channel bandwidth will result in different transmission rates and, hence, different subscriber access times. For example, doubling the compression performance to 600 Kbits/second and doubling the modulation rate to 228 Mbits/second results in quadrupling system performance so that each program is transmitted in 19 seconds (190 programs per hour). Increased performance may also be obtained by multiplexing numerous channels to increase available bandwidth.

Receiver 40 illustrated in FIG. 1 represents the equipment located at one or more destinations for receiving, storing, and playing back programs transmitted as described above. A conventional user interface (not illustrated) is utilized to request programs and communicate with the library 55. Library 55 includes the on-line storage of wheel 22, as well as the off-line storage 20. Receiver 40 includes a VID monitor 45 that is employed to monitor transmission line 30 for transmission segment 35 (program number 15). When transmission segment 35 does not match the VID (a VID is data that uniquely identifies the program, as explained in detail below), the transmission is ignored. Upon matching the VID, receiver 40 is then utilized for receiving and storing transmission segment 35. Having received the desired program, receiver 40 may be employed for decompression and playback of the program on display 50 at the subscriber's convenience.

A predictable transmission schedule is the major feature of the broadcast video burst transmission system of the present invention. This is in sharp contrast to VOD systems, which involve no schedule at all. Many scheduling variations may be implemented in the present system without sacrificing any of its benefits. For example, the program transmission schedule may be determined dynamically, based upon statistical analysis of the demand for certain programs. Wheel 22 of FIG. 1 stores sixteen programs that are cycled for transfer to transmission line 30 on a regular, predictable schedule, resulting from rotation of wheel 22. Transmission of these same sixteen programs, each of which is stored in one of the wheel segments 25 of wheel 22, is repeated on each rotation of wheel 22. However, a program stored in off-line storage 20 may be determined by industry sources or statistical analysis, for example, to be new one of the top sixteen programs. In that event, it may be desired to replace one of the sixteen programs currently stored on wheel 22 with the new program previously stored in off-line storage 20. This replacement of programs associated with various ones of the wheel segments 25 of wheel 22 may occur at regularly scheduled intervals. Of course, such schedule changes must be communicated to each subscriber in some manner, such as by way of a video channel that continuously displays the current schedule of sixteen programs.

It is important to recognize that in the foregoing example in which the programs stored on wheel 22 and, thus, the transmission schedule for those programs, are dynamically changing, a schedule nevertheless exists. This predictable schedule is a factor that helps to minimize the amount of on-line storage required, but that is transparent and not limiting to the subscriber. Rather, the use of burst transmission of the programs stored on wheel 22 offers such a convenient and rapid selection of programs, with only a short queue time before a selected program is received, that the subscriber may believe he is being served by a VOD system. The predictable schedule, even a dynamically changing one, results in a reduction in storage costs. This savings can be realized as long as the entirely random selection of programs available to the subscriber in a VOD system is eliminated. Given this requirement, the transmission schedule of the broadcast video burst transmission system of the present invention is predictable enough to reduce the complexity of library 55 as compared to a VOD system. By employing a known schedule, fewer programs need to be stored on-line on wheel 22 of library 55, without this fact being readily apparent to the subscriber.

Another major feature of the broadcast video burst transmission system of the present invention is the use of burst transmission of programs in less than real time, as taught in the prior art by Lang. By using this type of transmission system, many benefits are realized. Such a system includes a source and a destination with transmission from source to destination in less than real time. The primary benefit is that the subscriber receives the selected program in a digital compressed format, which is stored at the subscriber's location for decompression and viewing at the subscriber's convenience. Since the destination equipment processes the digital compressed format of the program, VCR-like functions are available, such as stop, pause, rewind, and fast forward. This unique feature of the present invention results in a system that resembles having an electronic video rental store accessible from the subscriber's home.

Figure 2:
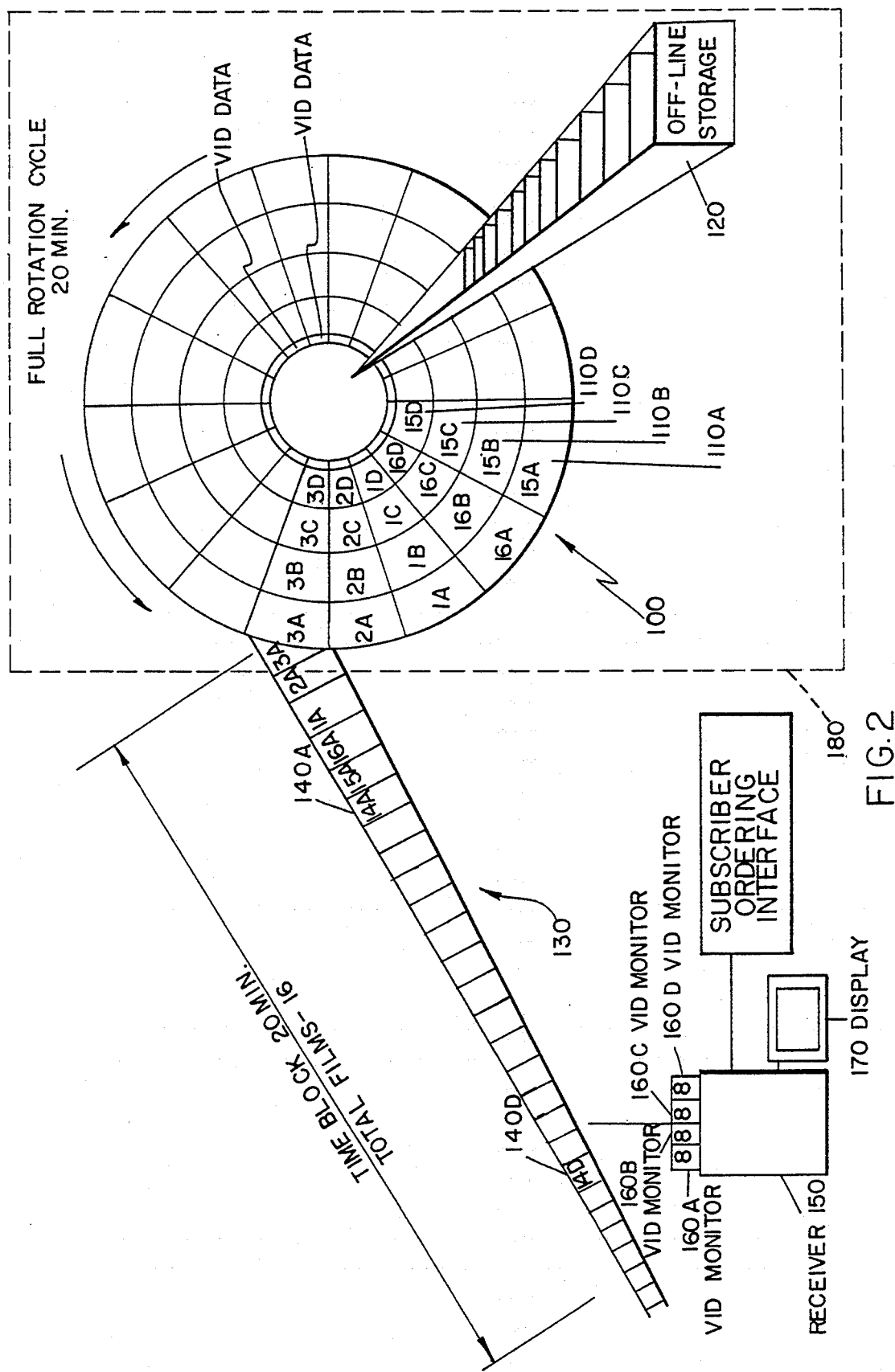
FIG. 2 is a pictorial diagram illustrating the way in which the broadcast video burst transmission system of FIG. 1 may be configured to transmit portions of audio/video programs in order to reduce storage costs.

Referring now to FIG. 2, there is illustrated a second embodiment of the present invention. This embodiment includes a wheel 100 having a plurality of wheel subsegments 110a-110d, an off-line storage 120, a transmission line 130, transmission line segments 140a-140d, a receiver 150, VID monitor segments 160a-160d, and a display 170. Wheel 100, off-line storage 120, and external control hardware and software (not shown) comprise a library 180. Similar in concept to the embodiment of FIG. 1, the embodiment of FIG. 2 burst transmits portions of a movie or other audio/video program rather than the entire movie. The wheel 100 of FIG. 2 includes a number of arcuate sectors, each of which is divided into four radially extending segments. As illustrated, for example, the wheel sector containing program number 15 is divided into four program segments 15a, 15b, 15c, and 15d, labeled as wheel subsegments 110a-d. Consequently, wheel subsegment 110a stores a portion of program 15, wheel subsegment 110b stores another portion of program 15, etc. As in the embodiment of the invention illustrated in FIG. 1, off-line storage 120 is employed to store less popular programs on slower, less costly storage media.

As wheel 100 rotates counter-clockwise, one of the wheel segments representing one portion of a program, is burst transmitted. The transmission of an entire program, such as program number 15, for example, invoves the separate burst transmissions of program segments 15a, 15b, 15c, and 15d.

While FIG. 2 illustrates four radially extending storage segments comprising each of the 16 arcuate sectors of wheel 100, the actual number of radially extending segments may vary and would most likely be evenly distributed over the entire length of a transmission cycle in order to minimize the amount of storage required for each program segment. In the example illustrated in which each program is divided into four segments, each segment represents 30 minutes of real time viewing. Using the same transmission parameters as described above in connection with the system of FIG. 1 (114 Mbit/second transmission rate and 1.2 Mbits/second compressed video rate), one wheel segment is burst transmitted in 19 seconds. That 19-second burst transmission, received and stored by receiver 150, represents 30 minutes of viewing when decompressed and played back in real time. In the present example, the two-hour program 15 is burst transmitted by burst transmitting four separate program segments 15a, 15b, 15c, and 15d, each program segment requiring 19 seconds for transmission and representing 30 minutes of viewing time.

The use of a system such as that illustrated in FIG. 2 for receiving and viewing a program, for example, is as follows. As wheel 100 rotates such that it becomes time to transmit program number 3, which is divided into segments 3a-3d, segment 3a is first transmitted. If the subscriber has ordered program number 3 through the user interface of receiver 150, then VID monitor 160 monitors transmission line 130 for the VID which identifies ordered program number 3. Note that VID monitor 160 is divided into VID monitor segments 160a-160d. This corresponds with the fact that VID monitor 160 must monitor transmission line 10 for each appropriate transmitted segment 140a-140d. Consequently, VID monitor 160 will receive transmitted segments and enable storage of these segments four separate times for transmitted segments 140a-140d. In this manner, each transmitted segment 140a-140d for the program that has been ordered is received and stored within receiver 150.

In the present example, when the first 19-second transmitted segment is received and stored, playback of that program segment by the subscriber may begin. At that point in time, the subscriber has full VCR-like control over a 30-minute segment of the program. To maintain the real time decompression and playback of the program, receiver 150 must receive and store the next transmitted segment before playback of the previously stored segment has been completed. In order to provide a seamless, uninterrupted playback of the program, receiver 150 should begin receiving the next segment 19 seconds before playback of the previously received segment has been completed. In doing so, the next segment overwrites the prior segment in storage within receiver 150 as playback of the previously stored segment is completed. This incoming segment then becomes the current segment and receiver 150 then continues a seamless playback by beginning the decompression and playback of the newly received segment.

Such an embodiment reduces the cost of the receiver 150 at the subscriber's location by reducing the amount of storage required. In the example described immediately above, one-fourth the usual storage capacity is required in receiver 150. Different levels of segmentation may be used, depending on marketing, economic, and strategic considerations.

The requirement to transmit the next program segment in time, i.e. before the segment previously stored within receiver 150 is completely decompressed and viewed in real time, results in some increased complexity. Timing and control of the transmission of the next segment of the program is managed by the library 180. Having only a portion of the program stored in receiver 150 also imposes some operational limitations. For example, the subscriber would not be able to rewind or fast-forward beyond the beginning or end of the portion of the program that is currently stored in receiver 150. However, it will be obvious to one skilled in the art that these tradeoffs may be designed into the system of the present invention based on strategic and economic considerations. For example, market analysis may show that subscribers are willing to have limited VCR-like control in order to reduce the cost of receiver 150. Perhaps the analysis would show that a 15-minute buffer, during which the subscriber would have full VCR-like control, is acceptable.

Many other benefits are realized in the embodiment of FIG. 2. The communications channel used for the transmission is not occupied for the entire viewing time of the program, as it is in real-time broadcast systems. This results in the ability to use the communications channel more efficiently. In one example, if a burst transmission of a two-hour program occupies a few minutes of transmission time, and the scheduling process has resulted in a two-minute gap between burst transmissions of consecutive program transmissions, then that gap may be used for any purpose, such as data transmission, voice communications, a burst transmission of a segment from another program, a burst transmission of an entire program, or transmission of the schedule information of the present invention. This benefit cannot be realized by real-time systems since the bandwidth is used in a real-time mode.

Another benefit that results from the broadcast video burst transmission system of the present invention is the lowered susceptibility to loss of signal. In a real-time, channelized distribution system, any loss of signal results in the loss of some viewing time. In the present invention, the time during which the system is susceptible to loss of signal is lowered dramatically. For example, while a real-time system signal might be interrupted anywhere in its two-hour program transmission, a burst transmission in accordance with the present invention may be susceptible for only a few minutes. Of course, the actual time required for a burst transmission is dependent on several factors, including the level of the digital video compression, communications channel bandwidth, and the performance of the storage systems.

A loss of signal in the system of the present invention would at first seem to affect the system more adversely than a real-time system. In a real-time system, a five-minute loss is literally a loss of five minutes of viewing of transmitted program. In the present system, a five-minute loss could result in loss of the entire program. However, the present invention actually offers benefits in this area as well. Real-time systems are limited by the time domain. If a five-second or even a five-minute loss occurs, there is no possibility for recovering the lost material since the time-frame for the missed viewing has passed. On the other hand, the present system, due to its use of the Lang prior art burst transmission technique, is not limited by the time domain. If a loss occurs during transmission, digital error-correcting techniques may be used to detect the loss. When a loss occurs, the system may automatically retransmit the corrupt or missing data. In an embodiment in which viewing by the subscriber does not take place until an entire program or portion of a program is received, this retransmission may occur an indefinite number of times and is transparent to the subscriber. Full recovery is therefore virtually guaranteed.

The present invention is operative via a variety of digital transmission means. In one embodiment, the transmission means is an ATM (Asynchronous Transfer Mode) network, such as those currently being deployed by telephone companies, cable companies, and for use in computer networks. In such a network, the digital data is packetized, and time-dependent data such as audio/video data is guaranteed to arrive at the destination at the appropriate time. Therefore, real-time compressed video transmissions are likely to occur on such networks. The present invention, with its use of burst transmission, can coexist in a given bandwidth on an ATM network with other burst audio/video transmissions, real-time audio/video transmissions, and any other digital data. The packetized, time-guaranteed nature of such a network ensures that these disparate transmission methods can coexist.

Referring now to FIG. 3, there is shown a hardware block diagram of the broadcast video burst transmission system of the present invention. A library 210 is connected to a receiving unit 220 via transmission line 230. Library 210 comprises a storage unit 240, a controller 250, a CPU 260, a memory 270, a bus 280, and a transceiver 290. Receiving unit 220 comprises a storage unit 300, a controller 310, a bus 320, a memory 30, a receiver 340, a CPU 60, a decompressor 370, and an optional compressor 90.

Compressed digital audio/video programs, such as movies, may be entered into storage unit 240 in several ways. First, storage unit 240 may comprise any of a number of different types of storage media, including, but not limited to, magnetic disk, optical disk, random access memory or combinations thereof. Furthermore, storage unit 240 may utilize a removable storage medium, such as an optical disk, a removable magnetic disk, digital tape or a floppy disk. In such a case, the physical media itself, such as an optical disk, is inserted into the storage mechanism for reading or possible transfer to another media type. It is anticipated that different embodiments of the present invention will utilize different types of medial for storage unit 240, with some embodiments using several types of storage media.

In addition, any of several different types of transceivers may be employed as transceiver 290. These include, but are not limited to, transceivers for fiber optic lines, microwave, satellite, coaxial cable, broadcast television, and telephone lines. In some embodiments, the transceiver employed for burst transmission of programs to receiving unit 220 will differ from the transceiver used for updating storage unit 240 of library 210. In other embodiments, a separate transceiver (not shown) may be used for updating storage unit 240. For example, one embodiment is envisioned that uses coaxial cable for distribution of programs to subscribers, each of whom would have an embodiment of receiving unit 220 at his location, while fiber optic lines or satellite links may be used for very rapid updating of storage unit 240.

In any event, storage unit 240 may be updated with new material whenever appropriate. This can mean offloading the less-popular programs to cheaper off-line storage devices for storage unit 240, such as magnetic tape. This off-loading helps to reduce the cost of the storage required for library 210. Higher performance storage devices, on the other hand, may be used for the programs that comprise the current schedule of programs beng broadcast by the broadcast video burst transmission system of the present invention. Higher performance storage devices can be required to maintain a bit rate in reading the data to keep up with the required transmission rate of transceiver 290.

Storage unit 20 of library 210 is operative for retrieving and transmitting the stored time compressed programs according to a predetermined schedule. The timing of this schedule and the selection of the programs from storage unit 20 occur under control of CPU 260. This operation is accomplished in accordance with the flow chart of FIG. 4, which is described in detail below.

As CPU 260 initiates the burst transmission of scheduled programs, it interfaces to storage unit 240 for reading program information into buffer memory 270. The purpose for reading into a buffer memory 270 is to aid in the interface to transceiver 290, which transmits the program information over transmission line 230. In transmitting via transmission line 230, the protocol of the transmission line must be adhered to. For example, in an embodiment where transmission line 230 comprises a fiber optic line, some type of protocol, such as SONET, is used. In most cases, the data format as stored in storage unit 240 is incompatible with the format required for transmission by the protocol of transmission line 230. Therefore, the data is read from storage unit 240 into memory 270 via controller 250, and properly reformatted and timed for adherence to the protocol defined by transmission line 230. All of the foregoing operations are performed under control of CPU 260, with data moving between the components illustrated in FIG. 3 via bus 280.

Figure 5:
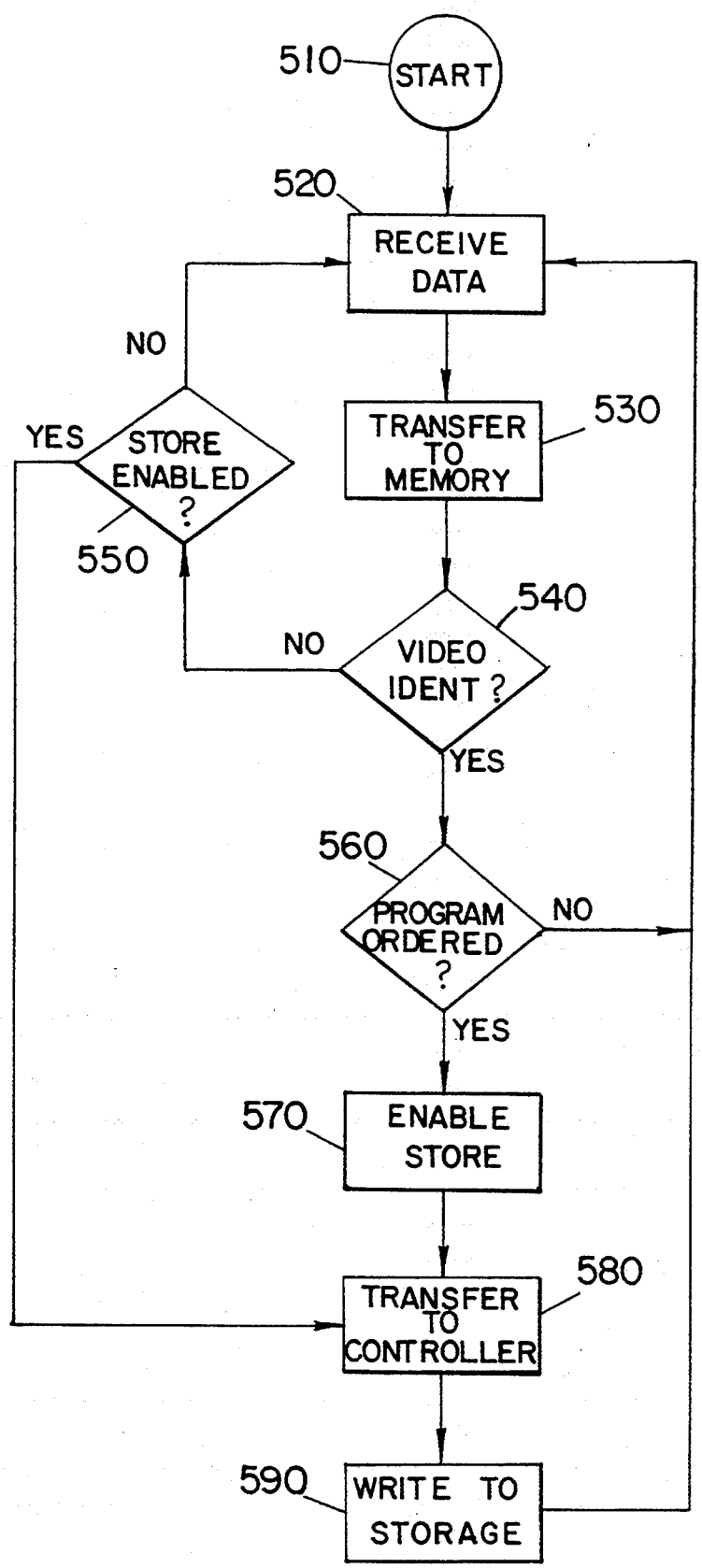
FIG. 5 is a flowchart of operation of a receiver at each subscriber's location in the broadcast video burst transmission system of FIG. 1.

Receiving unit 220 is connected to transmission line 230 via receiver 340 and may be operative for continuously monitoring the incoming data from transmission line 230. The incoming data is transferred to memory 330 via bus 320 and examined by CPU 360 for data to indicate that the incoming program has been ordered. If it has not been ordered, the data is ignored. When the enabling data is found, CPU 360 enables the system to store the incoming data in storage unit 300, as described below. This process is depicted in the flowchart of FIG. 5, which is also described in detail below.

Receiver 340 transfers the incoming data to memory 330. Under control of CPU 360, the data is stripped of any protocol header information, resulting in the same data that had been stored in storage unit 240 of library 210. The data is transferred via bus 320 to controller 310. Controller 310 writes the time compressed data to storage 300. All of the foregoing operations are performed under control of CPU 360. When viewing is initiated by a user interface (not illustrated) of receiving unit 220, controller 310 reads the data from storage unit 300 and transfers the data to decompressor 370. Decompressor 370 decodes the compressed data and, in one embodiment, converts the digital data to an analog signal for viewing that is available at a video out terminal 380. In another embodiment, the display device is digital. Consequently, analog-to-digital conversion is not required. Video out terminal 380 is connected to an appropriate display device (not shown), such as a conventional television or computer monitor. Consequently, the foregoing decompression may include format conversion for the display device. The decompression process also has memory 330 available for the decoding process when the compression algorithm may require such memory.

In another embodiment of the present invention, receiving unit 220 also includes compressor 390 for receiving an input audio/video signal at a video in terminal 395. Under control of CPU 360 and with access to bus 320 and memory 330, incoming audio/video signals may be compressed and written to storage unit 300 via controller 310. In providing such a feature, the present invention may be used as a digital VCR for use in recording programs or other program information from standard broadcast sources such as cable television, network television, satellite, cameras, etc. The stored time compressed programs may be decompressed and viewed with VCR-like control in like manner to that described above for viewing a stored program that was burst transmitted to a subscriber.

In another embodiment of the present invention, receiving unit 220 may include a transceiver (not shown), in addition to or in place of receiver 340 for both real-time and burst transmissions of any stored time compressed program or other audio/video program information.

Referring now to FIG. 4, there is shown a flow chart of the process for burst transmitting programs from library 210 from the time that a subscriber orders a program until transmission of that program is completed. Included is a step 470 as a gray action step to indicate that ordering does not affect the process as a whole. That is, this step is not part of the process at library 210 that results in transmission of a program. It is depicted in the flow chart of FIG. 4 to delineate a sample time frame in which the subscriber places a program order, relative to the process as a whole.

The process begins with a play list being communicated to the subscriber in some manner, as indicated by step 420. This play list would most likely contain information such as a list of available program titles and queue times, and may be provided in any number of ways, such as devoting a television channel to text denoting the play list. Based on the play list, the subscriber may order a program at any time. This is accomplished through any convenient means well known in the PPV art, such as by way of a touch-tone telephone or by interface to a cable converter box.

Next, the library 210 must determine if the next program in the play list is stored in on-line or off-line storage unit 430. This part of the process is optional, but allows for programs to be stored on off-line storage media such as magnetic tape, optical disk, etc. Typically, off-line storage is less costly than on-line storage, but has insufficient read speed to interface to the transmission line at the desired bit rate. For this reason, off-line storage is brought on line by reading the data from the slower off-line storage to faster on-line storage such as RAM, magnetic disk, etc. Thus, the process illustrates a determination by the system as to whether an upcoming scheduled program must first be brought on line.

Once the next program is on line and ready for transmission, the system simply waits for the appropriate time, as indicated by process block 450, and then begins transmission, as indicated by process block 460. During this idle period while the system waits for a transmission, the system may be used for other purposes, such as communicating an updated schedule. In such an embodiment, care must be take to ensure that the system continues to monitor the time so that transmission of the next scheduled program may begin when appropriate. This process of bringing off-line programs into on-line storage for transmission may be distinguished from a VOD system in that it is automated. The off-line storage and change to on-line storage is determined by the system based upon a predetermined, although sometimes dynamic, schedule. In any case, it is the broadcast video burst transmission system of the present invention that determines the schedule, not a selection by a subscriber from a virtually unlimited video library. This distinction provides many of the benefits of a VOD system without the expense of maintaining a large video library.

Referring now to FIG. 5, there is shown a flow chart of the process performed by receiver 340. This process includes the steps of receiving data 520, transferring data to memory 50, determining if a VID is included 540, determining if storing is enabled 550, determining if the program has been ordered 560, enabling storing 570, transferring data to the controller 580, and writing to storage 590. With additional reference to FIG. 3, the process illustrated in FIG. 5 begins by receiving data at receiver 340, as indicated by process step 520. This data is transferred, as indicated by process step 530, to memory 330 via bus 320. The incoming data is received in blocks, with the block size being determined by the protocol used for transmission over transmission line 230 and the desired performance of the system. During the process of transferring the data block to memory 330, the data block may be reformatted by CPU 360 to remove protocol information, as previously described.

The receiving equipment of the present invention must monitor the system for the programs that have been ordered or the receiver must be addressable in some manner. In one embodiment, CPU 360 examines the data block to determine if it contains a video identification (VID), as indicated by process step 540. VIDs are defined as a system implementation dependent string of data that identifies the program being transmitted. In one embodiment, VIDs are transmitted only at the beginning of a program, with the data that follows representing the compressed digital video data of the program. In the preferred embodiment, VIDs are interspersed at regular intervals throughout the compressed digital video data. VIDs must be defined to be easily distinguishable from compressed digital video data, and are dependent to some degree on the selected compression algorithm. Such a design choice is well within the capability of one of ordinary skill in the art.

If the data block includes a VID, CPU 360 must also determine if the program is one that the subscriber has ordered, as indicated by process step 560. If it has not been ordered, the data is ignored, and the system is operative for receiving the next block of data, as indicated by process step 520. If the data contains a VID of a program that has been ordered, storage is enabled, as indicated by process step 570, and the data is transferred to controller 310, as indicated by process step 580, which in turn writes the data to storage unit 300, as indicated by process step 590. Prior to writing the data to storage unit 300, CPU 360 may further reformat the data, such as by removing the VIDs from it so that a pure compressed digital video may be stored for later decompression and viewing. Upon storing the data, the system is ready for the next block of incoming data. Enabling storage may consist of setting a few bits within memory 330 or enabling specific circuitry (not shown) in receiving unit 220. With a VID having been found and storage enabled because the program had been ordered, all future data blocks which represent compressed digital video portions of the program will be written to storage unit 300. By not requiring every data block to have a VID, the transmission of a significant amount of redundant data is avoided.

If no VID is found in the data block, the process then includes determination of whether storing has been enabled, as indicated by process step 550. When store has been enabled from a previous data block, the data does not contain a VID because the entire data block represents compressed digital video of a program that has been ordered. Consequently, the data is transferred to controller 310 and written to storage unit 300. If the data does not contain a VID and store has not been enabled, the data may be ignored.

In any case, when a proper VID has been identified, the burst transmission of that program is captured and stored for viewing. Consequently, billing may take place for the ordered program. In one embodiment, the receiver equipment communicates back to the system library that the selected program has been received, so the subscriber may be appropriately billed. However, the present invention does not require such back-channel communication. Since the system cycles through burst transmissions, no back channel to the system library is required for ordering. Rather, the receiver equipment simply captures the appropriate incoming burst transmission. Similarly, for billing, a back channel is not required. In one embodiment, billing may take place by updating system software at the local receiving equipment. The receiving equipment may be polled periodically by the system for billing purposes. For example, the receiving equipment may be connected to a telephone line, via modem in most cases, in addition to the network connection for the burst transmissions. Once per month, billing software running on a computer system located at the library may connect to the receiving equipment to obtain usage information for the past month. This type of polling may happen in any desired period, perhaps even nightly.

The additional telephone line connection (not shown) also provides the present invention with a remote diagnostic feature. Through this connection, computer hardware at a remote site may diagnose the system by sending test data and commands and monitoring the results. In this manner, system faults may be identified to a level such that a technician may bring replacement components to the receiver for repair, without moving the receiver to a repair center.

An important use of the broadcast video burst transmission system of the present invention is to implement it on multiple channels and incorporate a theme for each channel. As an example, a operator of such a system can offer a comedy channel, as well as channels that concentrate on drama, action, science fiction, etc. In this manner, the subscriber can have any one of a very large number of the top films of a certain category available in a very short time frame. On the other hand, with a single channel, the play list may include 100 various burst transmissions before a particular horror film is transmitted, for example. This limitation may be avoided by implementing theme broadcasting.

It is also important to note that the digitization and compression of a program for entering into a video library may be reduced in time. This building of a time compressed video library does not need to take place in real time. If the selected vendor's equipment supports it, a program may be captured and compressed at an accelerated rate that is less than real time. For example, for the compression process, a program that would normally be viewed at a rate of 30 frames per second may be played back at 300 frames per second from the source. Such an embodiment would reduce the time required to compress a one-hour program to only six minutes. This embodiment offers a time savings which would directly affect the marketability of such a system, as it has the unique ability to quickly update a video library by compressing and then distributing programs in less than real time. For example, a one-hour live event that had just been broadcast over conventional television could be compressed and distributed to broadcast video burst transmission libraries, available for burst transmission to subscribers, in just minutes.

We claim:

1. A broadcast video burst transmission cyclic distribution apparatus comprising:

on-line storage means for storing a predetermined number of audio/video programs and being operative for providing access to said audio/video programs for burst transmission thereof;

burst transmission means coupled to said on-line storage means for accessing said audio/video programs stored in said on-line storage means in a predetermined sequence and for burst transmitting said audio/video programs to a multiplicity of subscriber locations in said predetermined sequence in which they are accessed from said on-line storage means, said burst transmission means being further operative for repeatedly burst transmitting the predetermined sequence of audio/video programs accessed from said on-line storage means; and receiving means at each subscriber location, each of said receiving means being coupled to said burst transmission means and operative for receiving the audio/video programs stored in said on-line storage means and burst transmitted in said predetermined sequence by said burst transmission means and for selectively storing one or more of the audio/video programs for real-time playback by the subscriber.

2. A broadcast video burst transmission cyclic distribution apparatus as in claim 1 wherein said burst transmission means comprises a communications network and transceiver means, coupled thereto, for burst transmitting audio/video programs to a remote location and for receiving audio/video programs burst transmitted from a remote location.

3. A broadcast video burst transmission cyclic distribution apparatus as in claim 1 further comprising a communication network and transceiver means, coupled to said communications network and to said on-line storage means, for burst transmitting a selected one or more of said audio/video programs stored in said on-line storage means to a remote location and for receiving a selected one or more audio/video programs burst transmitted from a remote location for storage in said on-line storage means.

4. A broadcast video burst transmission cyclic distribution apparatus as in claim 1 wherein:

said burst transmission means includes controller means coupled to said on-line storage means for controlling said on-line storage means, a data bus coupled to said controller, microprocessor means coupled to said controller means and to said data bus for executing routines and subroutines of instructions, buffer memory means coupled to said data bus for buffering data transferred to and from said controller means, a communications network interface coupled to an external communications network for interfacing said burst transmission means to said external communications network, and transceiver means coupled to said data bus for burst transmitting said audio/video programs stored in said on-line storage means to said multiplicity of subscriber locations; and said receiving means includes a communications network interface coupled to said external communications network for interfacing said receiving unit to said external communications network, means for receiving compressed data representative of the audio/video programs burst transmitted by said burst transmission means, a data bus for transferring said compressed data, buffer memory means coupled to said data bus for buffering said compressed data, storage means for storing said compressed data, controller means coupled to said storage means and to said data bus for controlling operation of said storage means, microprocessor means coupled to said data bus for executing routines and subroutines of instructions, and decompression means coupled to said microprocessor means and to said data bus for decompressing said compressed data for real-time playback by the subscriber of a selected one or more of the audio/video programs represented thereby.

5. A broadcast video burst transmission cyclic distribution apparatus as in claim 1 wherein said on-line storage means comprises magnetic disk storage.

6. A broadcast video burst transmission cyclic distribution apparatus as in claim 1 wherein said on-line storage means comprises a semiconductor memory.

7. A broadcast video burst transmission cyclic distribution apparatus as in claim 1 wherein said on-line storage means comprises magnetic tape storage.

8. A broadcast video burst transmission cyclic distribution apparatus as in claim 1 wherein said on-line storage means comprises optical disk storage.

9. A broadcast video burst transmission cyclic distribution apparatus as in claim 1 wherein said burst transmission means comprises a fiber optic transceiver.

10. A broadcast video burst transmission cyclic distribution apparatus as in claim 1 wherein said burst transmission means comprises a coaxial cable transceiver.

11. A broadcast video burst transmission cyclic distribution apparatus as in claim 1 wherein said burst transmission means comprises a satellite transceiver.

12. A broadcast video burst transmission cyclic distribution apparatus as in claim 1 wherein said burst transmission means comprises a microwave transceiver.

13. A broadcast video burst transmission cyclic distribution apparatus as in claim 1 wherein said burst transmission means comprises a telephone transceiver.

14. A broadcast video burst transmission cyclic distribution apparatus as in claim 1 wherein said on-line storage means further comprises video identification data storage means for storing identification data associated with each of the audio/video programs stored in said on-line storage means.

15. A broadcast video burst transmission cyclic distribution apparatus as in claim 14 further comprising subscriber ordering means coupled to said receiving means for enabling a subscriber to selectively order any of the audio/video programs received by said receiving means.

16. A broadcast video burst transmission cyclic distribution apparatus as in claim 14 further wherein said receiving means includes storage means for storing the audio/video programs received by said receiving means.

17. A broadcast video burst transmission cyclic distribution apparatus as in claim 16 further comprising video identification monitoring means coupled to said receiving means for monitoring each of the audio/video programs received by said receiving means to detect said identification data associated with each of the audio/video programs, said video identification monitoring means being operative for determining correspondence between identification data detected thereby and identification data of an audio/video program ordered by a subscriber and being further operative upon determining such correspondence for enabling storage within said receiving means of the audio/video program ordered by the subscriber.

18. A broadcast video burst transmission cyclic distribution apparatus as in claim 16 wherein said storage means comprises magnetic disk storage.

19. A broadcast video burst transmission cyclic distribution apparatus as in claim 16 wherein said storage means comprises magnetic tape storage.

20. A broadcast video burst transmission cyclic distribution apparatus as in claim 16 wherein said storage means comprises optical disk storage.

21. A broadcast video burst transmission cyclic distribution apparatus as in claim 16 wherein said storage means comprises a semiconductor memory.

22. A broadcast video burst transmission cyclic distribution apparatus as in claim 1, further comprising off-line storage means coupled to said on-line storage means for storing a multiplicity of additional audio/video programs to be selectively transferred to said on-line storage means to thereby update the predetermined number of audio/video programs stored in said on-line storage means.

23. A broadcast video burst transmission cyclic distribution apparatus as in claim 22 further comprising a communication network and transceiver means, coupled to said communications network and to said off-line storage means, for burst transmitting a selected one or more of said audio/video programs stored in said off-line storage means to a remote location and for receiving a selected one or more audio/video programs burst transmitted from a remote location for storage in said off-line storage means.

24. A broadcast video burst transmission cyclic distribution apparatus as in claim 22 wherein said off-line storage means comprises magnetic disk storage.

25. A broadcast video burst transmission cyclic distribution apparatus as in claim 22 wherein said off-line storage means comprises a semiconductor memory.

26. A broadcast video burst transmission cyclic distribution apparatus as in claim 22 wherein said off-line storage means comprises magnetic tape storage.

27. A broadcast video burst transmission cyclic distribution apparatus as in claim 22 wherein said off-line storage means comprises optical disk storage.

28. A broadcast video burst transmission cyclic distribution apparatus as in claim 22 wherein said off-line storage means further comprises video identification data storage means for storing identification data associated with each of the audio/video programs scored in said off-line storage means.

29. A broadcast video burst transmission cyclic distribution apparatus as in claim 28 further comprising subscriber ordering means coupled to said receiving means for enabling a subscriber to selectively order any of the audio/video programs received by said receiving means.

30. A broadcast video burst transmission cyclic distribution apparatus as in claim 28 further wherein said receiving means includes storage means for storing the audio/video programs received by said receiving means.

31. A broadcast video burst transmission cyclic distribution apparatus as in claim 30 further comprising video identification monitoring means coupled to said receiving means for monitoring each of the audio/video programs received by said receiving means to detect said identification data associated with each of the audio/video programs, said video identification monitoring means being operative for determining correspondence between identification data detected thereby and identification data of an audio/video program ordered by a subscriber and being further operative upon determining such correspondence for enabling storage within said receiving means of the audio/video program ordered by the subscriber.

32. A broadcast video burst transmission cyclic distribution apparatus comprising:
   on-line storage means for storing a predetermined number of audio/video programs, each of said audio/video programs being stored as a plurality of program segments, said on-line storage means being operative for providing access to said audio/video programs for burst transmission thereof;
   burst transmission means coupled to said on-line storage means for accessing said audio/video program segments stored in said on-line storage means in a predetermined sequence and for burst transmitting said audio/video program segments to a multiplicity of subscriber locations in said predetermined sequence in which they are accessed from said on-line storage means, said burst transmission means being further operative for repeatedly burst transmitting the predetermined sequence of audio/video program segments accessed from said on-line storage means; and
   receiving means at each subscriber location, each of said receiving means being coupled to said burst transmission means and operative for receiving the audio/video program segments stored in said on-line storage means and burst transmitted in said predetermined sequence by said burst transmission means and for selectively storing one or more of the audio/video program segments for playback by the subscriber.

33. A broadcast video burst transmission cyclic distribution apparatus as in claim 32 wherein said burst transmission means comprises a communications network and transceiver means, coupled thereto, for burst transmitting audio/video programs to a remote location and for receiving audio/video programs burst transmitted from a remote location.

34. A broadcast video burst transmission cyclic distribution apparatus as in claim 32 further comprising a communication network and transceiver means, coupled to said communications network and to said on-line storage means, for burst transmitting a selected one or more of said audio/video programs stored in said on-line storage means to a remote location and for receiving a selected one or more audio/video programs burst transmitted from a remote location for storage in said on-line storage means.

35. A broadcast video burst transmission cyclic distribution apparatus as in claim 32 wherein said on-line storage means comprises magnetic disk storage.

36. A broadcast video burst transmission cyclic distribution apparatus as in claim 32 wherein said on-line storage means comprises a semiconductor memory.

37. A broadcast video burst transmission cyclic distribution apparatus as in claim 32 wherein said on-line storage means comprises magnetic tape storage.

38. A broadcast video burst transmission cyclic distribution apparatus as in claim 32 wherein said on-line storage means comprises optical disk storage.

39. A broadcast video burst transmission cyclic distribution apparatus as in claim 32 wherein said burst transmission means comprises a fiber optic transceiver.

40. A broadcast video burst transmission cyclic distribution apparatus as in claim 32 wherein said burst transmission means comprises a coaxial cable transceiver.

41. A broadcast video burst transmission cyclic distribution apparatus as in claim 32 wherein said burst transmission means comprises a satellite transceiver.

42. A broadcast video burst transmission cyclic distribution apparatus as in claim 32 wherein said burst transmission means comprises a microwave transceiver.

43. A broadcast video burst transmission cyclic distribution apparatus as in claim 32 wherein said burst transmission means comprises a telephone transceiver.

44. A broadcast video burst transmission cyclic distribution apparatus as in claim 32 wherein said on-line storage means further comprises video identification data storage means for storing identification data associated with each of the audio/video programs stored in said on-line storage means.

45. A broadcast video burst transmission cyclic distribution apparatus as in claim 44 further comprising subscriber ordering means coupled to said receiving means for enabling a subscriber to selectively order any of the audio/video programs received by said receiving means.

46. A broadcast video burst transmission cyclic distribution apparatus as in claim 44 further wherein said receiving means includes storage means for storing the audio/video programs received by said receiving means.

47. A broadcast video burst transmission cyclic distribution apparatus as in claim 46 further comprising video identification monitoring means coupled to said receiving means for monitoring each of the audio/video program segments received by said receiving means to detect said identification data associated with each of the audio/video programs, said video identification monitoring means being operative for determining correspondence between identification data detected thereby and identification data of an audio/video program ordered by a subscriber and being further operative upon determining such correspondence for enabling storage within said receiving means of the audio/video program ordered by the subscriber.

48. A broadcast video burst transmission cyclic distribution apparatus as in claim 46 wherein said storage means comprises magnetic disk storage.

49. A broadcast video burst transmission cyclic distribution apparatus as in claim 46 wherein said storage means comprises magnetic tape storage.

50. A broadcast video burst transmission cyclic distribution apparatus as in claim 46 wherein said storage means comprises optical disk storage.

51. A broadcast video burst transmission cyclic distribution apparatus as in claim 46 wherein said storage means comprises a semiconductor memory.

52. A broadcast video burst transmission cyclic distribution apparatus as in claim 32, further comprising off-line storage means coupled to said on-line storage means for storing a multiplicity of additional audio/video programs to be selectively transferred to said on-line storage means to thereby update the predetermined number of audio/video programs stored in said on-line storage means.

53. A broadcast video burst transmission cyclic distribution apparatus as in claim 52 further comprising a communication network and transceiver means, coupled to said communications network and to said off-line storage means, for burst transmitting a selected one or more of said audio/video programs stored in said off-line storage means to a remote location and for receiving a selected one or more audio/video programs burst transmitted from a remote location for storage in said off-line storage means.

54. A broadcast video burst transmission cyclic distribution apparatus as in claim 52 wherein said off-line storage means comprises magnetic disk storage.

55. A broadcast video burst transmission cyclic distribution apparatus as in claim 52 wherein said off-line storage means comprises a semiconductor memory.

56. A broadcast video burst transmission cyclic distribution apparatus as in claim 52 wherein said off-line storage means comprises magnetic tape storage.

57. A broadcast video burst transmission cyclic distribution apparatus as in claim 52 wherein said off-line storage means comprises optical disk storage.

58. A broadcast video burst transmission cyclic distribution apparatus as in claim 52 wherein said off-line storage means further comprises video identification data storage means for storing identification data associated with each of the audio/video programs stored in said off-line storage means.

59. A broadcast video burst transmission cyclic distribution apparatus as in claim 58 further comprising subscriber ordering means coupled to said receiving means for enabling a subscriber to selectively order any of the audio/video programs received by said receiving means.

60. A broadcast video burst transmission cyclic distribution apparatus as in claim 58 further wherein said receiving means includes storage means for storing the audio/video program segments received by said receiving means.

61. A broadcast video burst transmission cyclic distribution apparatus as in claim 60 further comprising video identification monitoring means coupled to said receiving means for monitoring each of the audio/video program segments received by said receiving means to detect said identification data associated with each of the audio/video programs, said video identification monitoring means being operative for determining correspondence between identification data detected thereby and identification data of an audio/video program ordered by a subscriber and being further operative upon determining such correspondence for enabling storage within said receiving means of the audio/video program ordered by the subscriber.

* * * * *